United States Patent
Bruggemann

(10) Patent No.: US 11,766,674 B2
(45) Date of Patent: Sep. 26, 2023

(54) OPEN SYSTEM CRYO TUMBLE TRIMMER

(71) Applicant: Thomas Bruggemann, Woodland Hills, CA (US)

(72) Inventor: Thomas Bruggemann, Woodland Hills, CA (US)

(*) Notice: Subject to any disclaimer, the term of this patent is extended or adjusted under 35 U.S.C. 154(b) by 364 days.

(21) Appl. No.: 17/100,430

(22) Filed: Nov. 20, 2020

(65) Prior Publication Data

US 2022/0161269 A1 May 26, 2022

(51) Int. Cl.
| | | |
|---|---|---|
| *B02C 17/18* | (2006.01) | |
| *A01F 12/44* | (2006.01) | |
| *B02C 17/02* | (2006.01) | |
| *A01G 3/00* | (2006.01) | |
| *A23N 15/00* | (2006.01) | |
| *A01D 45/06* | (2006.01) | |

(52) U.S. Cl.
CPC ........ *B02C 17/1815* (2013.01); *A01D 45/065* (2013.01); *A01F 12/442* (2013.01); *A01G 3/00* (2013.01); *A23N 15/00* (2013.01); *B02C 17/02* (2013.01); *B02C 17/1855* (2013.01); *A01G 3/002* (2013.01); *A01G 2003/005* (2013.01)

(58) Field of Classification Search
CPC ........ A23N 15/00; A23N 15/02; B02C 17/02; B02C 17/1815; B02C 17/1855; A01G 3/00; A01G 3/002; A01G 2003/005; A01F 12/442; A01D 45/065
See application file for complete search history.

(56) References Cited

U.S. PATENT DOCUMENTS

| | | | | |
|---|---|---|---|---|
| 290,016 | A * | 12/1883 | Fairfield | B01D 9/0013 62/545 |
| 327,985 | A * | 10/1885 | Asher | A23G 9/18 165/DIG. 159 |
| 2,746,263 | A * | 5/1956 | Field | F25C 1/04 62/347 |
| 4,137,723 | A * | 2/1979 | Tyree, Jr. | A23L 3/363 62/85 |
| D280,628 | S * | 9/1985 | Besson | D15/147 |
| 7,008,528 | B2 * | 3/2006 | Mitchell | C10G 21/00 134/40 |
| 2012/0279193 | A1 * | 11/2012 | Mosman | A01G 3/00 56/233 |
| 2013/0175372 | A1 * | 7/2013 | Mosman | B02C 19/0056 241/230 |

(Continued)

FOREIGN PATENT DOCUMENTS

CA 3047464 A1 * 12/2019 ............ A23N 15/02

*Primary Examiner* — Arpad F Kovacs
(74) *Attorney, Agent, or Firm* — Reising Ethington P.C.

(57) ABSTRACT

A tumble trimmer system having a tumbler barrel with a perforated axle adapted for introducing a freezing agent such as liquid carbon dioxide or other liquefied gas adapted to flash freeze the plant material when infused into the mesh tumbler barrel, the mesh tumbler barrel adapted with mesh netting or screening for trimming and/or separating plant material enclosed therein, and with an open funnel or chute positioned below the tumbler barrel adapted to catch and direct trimmed and/or separated plant material exiting the tumbler barrel into a bin or container positioned under the funnel or chute, wherein the perforated axle comprises a plurality of perforations positioned around a circumference of and along an entire length of the axle.

19 Claims, 4 Drawing Sheets

(56) References Cited

U.S. PATENT DOCUMENTS

| | | | |
|---|---|---|---|
| 2014/0331837 A1* | 11/2014 | Holcomb | A23N 15/12 |
| | | | 83/104 |
| 2017/0197217 A1* | 7/2017 | Bruggemann | A23N 15/00 |
| 2018/0008656 A1* | 1/2018 | Watts | A23L 3/44 |
| 2019/0083558 A1* | 3/2019 | Watts | A23L 3/375 |
| 2019/0124851 A1* | 5/2019 | Ingram | A01G 3/00 |
| 2019/0168232 A1* | 6/2019 | Bruggemann | A01F 12/442 |
| 2019/0201936 A1* | 7/2019 | Rystadt | B07B 1/22 |
| 2019/0297782 A1* | 10/2019 | Mosman | A01G 3/00 |
| 2020/0108398 A1* | 4/2020 | Tharp | B02C 17/02 |
| 2020/0338566 A1* | 10/2020 | Bruggemann | A01G 3/002 |
| 2021/0045294 A1* | 2/2021 | Ingram | A01F 29/06 |
| 2021/0339264 A1* | 11/2021 | Hall | B02C 23/20 |

* cited by examiner

OPEN SYSTEM CRYO TUMBLE TRIMMER

TECHNICAL FIELD

The present disclosure relates to tumble trimming plant material, and, more particularly, to an open system cryo tumble trimmer or a tumble trimmer with a perforated axle adapted to infuse a freezing agent into a tumbler barrel for trimming plant material enclosed therein.

BACKGROUND AND SUMMARY

A variety of methods and equipment for trimming and separating plant material exist. For example, U.S. Pub. No. US 2019/0168232 A1 (Bruggemann), published Jun. 6, 2019, corresponding to U.S. patent application Ser. No. 15/786,441 filed Oct. 17, 2017, which is incorporated herein by reference, discloses floor-standing equipment and methods that employ nylon netting and/or fine mesh to trim off leafy matter, break down leafy matter, and separate various aspects of plants from each other. The netting and/or fine mesh is formed into a large cylindrical drum into which plant material is loaded through a door flap in the mesh cylinder. An electric motor or handcrank causes the load to tumble over itself and over a horizontal axle for 3-5 minutes at about 35 RPM. The plant matter trims, separates, and breaks itself down which then drops through the netting, down through a funnel bag into a basin on the floor. The flowers and/or larger plant material are then dropped out separately through the door flap in the netting and through the funnel bag into a second basin on the floor which replaced the first.

Also, U.S. Pub. No. US 2017/0197217 A1 (Bruggemann), published Jul. 13, 2017, corresponding to U.S. patent application Ser. No. 15/469,525 filed Mar. 25, 2017, which is incorporated herein by reference, discloses floor-standing equipment and methods that use nylon netting to grate trim off the seedless flowers of female cannabis plants. The netting is formed into large cylindrical drum into which about five pounds of dried seedless flowers of female cannabis plants are loaded through a door flap in the netting. An electric motor or handcrank causes the load to tumble over and over a horizontal axle for 3-5 minutes at about 35-RPM. The trim drops through the netting down through a funnel bag into a plastic basin on the floor. The trimmed seedless flowers are then dropped out separately through the door flap in the netting and through the funnel bag into a second plastic basin on the floor.

For processing (trimming) wet plant material, or plant matter containing more than a desirable amount of moisture for trimming using methods and equipment adapted or configured for processing of dried plant material, a liquid freezing agent may be introduced. For example, U.S. Pub. No. US 2019/0083558 A1 (Watts et al.), published Mar. 21, 2019, corresponding to U.S. patent application Ser. No. 15/832,614 filed Dec. 5, 2017 (the '614 application), which is incorporated herein by reference, discloses (according to its abstract) "[a] rotary separation apparatus deployed in a process for separating resinous trichomes from unwanted plant matter. A liquid freezing agent is introduced into a container of the plant matter to fragment the undesirable matter while the desired portion rich in trichome remain intact." However, the '614 application, also referred to by its assignee, "The Original Resinator," has several drawbacks and disadvantages.

The existing methods and equipment (as described in the '614 application and embodied in products dubbed "The Original Resinator", hereinafter, Resinator) is a closed system whereby a freezing agent is introduced into a closed system enclosure that houses a tumble trimming barrel with mesh filters through a valve on one side of the enclosure. There is only one point that the freezing agent enters the enclosure. Because it is a closed system, the freezing agent does not escape and thereby clouds everywhere within the enclosure (as the freezing agent is introduced), which ensures the freezing agent will effectively give coverage to all of the outside of the plant materials in the mesh barrel within the enclosure. The freezing agent enters via a large hole or holes near an end of the enclosure. The freezing agent is introduced and held within the closed enclosure until the temperature within the closed container reaches a predetermined level.

There are limitations in speed of processing and user-friendliness to the Resonator products, and as described in the '614 application. Because the Resonator is a closed system, the method of getting processed plant material out of the system is very slow, cumbersome, and not very user friendly. One has to open the closed system and remove both the catch container and barrel and dump the plant materials out, and then replace the barrel and catch container to begin the next subsequent batch. The Resonator includes, for example, a horizontally oriented cylindrically shaped drum that has a top portion that is latchably attached to a lower portion, within which a mesh tumbler is positioned. The top portion is removed and set to one side in order to open and fill the mesh tumbler. The top is repositioned and sealably closed over the lower portion so that the mesh tumbler containing the plant material is enclosed within the closed cylindrically shaped drum. A freezing agent such as liquid carbon dioxide ($CO_2$) is then introduced into the closed drum until the temperature throughout the closed drum reaches a predetermined temperature. The tumbler is rotated for a predetermined amount of time. And to unload the machine, the top portion of the cylindrically shaped drum is removed, and the mesh tumbler assembly (with its remaining contents) is lifted out of the cylindrically shaped drum (enclosure/chamber). The worker/user then unzips or opens the mesh netting of the tumbler assembly and shakes the tumbler assembly over a bin or container to catch the contents shaken/poured from the mesh tumbler assembly. And the procedure is repeated for subsequent batches of processing.

To address at least some of the shortcomings of the existing methods and equipment, such as the Resonator, the present inventor discovered and developed an open system and improvements, as described in the embodiments herein, permitting reductions in processing time (i.e. increases in speed of processing) and improved user friendliness. The described embodiments make the process much more user friendly and exponentially faster to process plant material. The described embodiments provide several differences from existing methods and equipment. According to various embodiments, a tumble trimmer is provided comprising a mesh tumbler barrel axially supported in a frame and oriented so as to tumble plant material about a horizontal axle, with the mesh netting of the tumbler barrel sized and oriented so as to trim plant material portions extending through the mesh openings and to permit plant material portions separated from larger plant portions due to the plant material tumbling over itself to pass through the mesh openings. In a first aspect, the described embodiments provide an open system tumble trimmer that comprises a large opening at the bottom to allow plant material to (gravitationally fall and) quickly exit (via, for example, a funnel/chute) into a separate container positionable there below, allowing for easily moving containers in and out instead of the cumbersome and labor intensive (and, thus, time intensive) existing methods and equipment explained above (e.g., for the Resonator). In one aspect, the opening below the mesh tumbler comprises a funnel with an opening to focus (or direct) the plant material into a separate container. In another aspect, the described embodiments comprise a method of introducing a freezing agent via openings all around and along the horizontal axle of the tumble trimmer. The method may use a different type valve (e.g., a rotary valve) for supply and regulation of the flow of a freezing agent, and the freezing agent is preferably introduced into the filtered barrel (i.e., mesh tumbler) through a perforated axle comprising many entry points (or holes) positioned all around and along the axle (instead of entering at one fixed point on one end as for the Resonator). Such a perforated axle, the present inventor discovered, allows for the freezing agent to be evenly distributed onto all the plant material within the tumbler barrel, ensuring full coverage and coverage free from damage to the plant material (for example, due to overly concentrated blasts or jets of introduced freezing agent).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

Similar reference numerals may have been used in different figures to denote similar components. FIGS. 1, 2, and 4 are shown approximately with components and portions in proportional size with one another, according to some embodiments.

DETAILED DESCRIPTION

Figure 1:
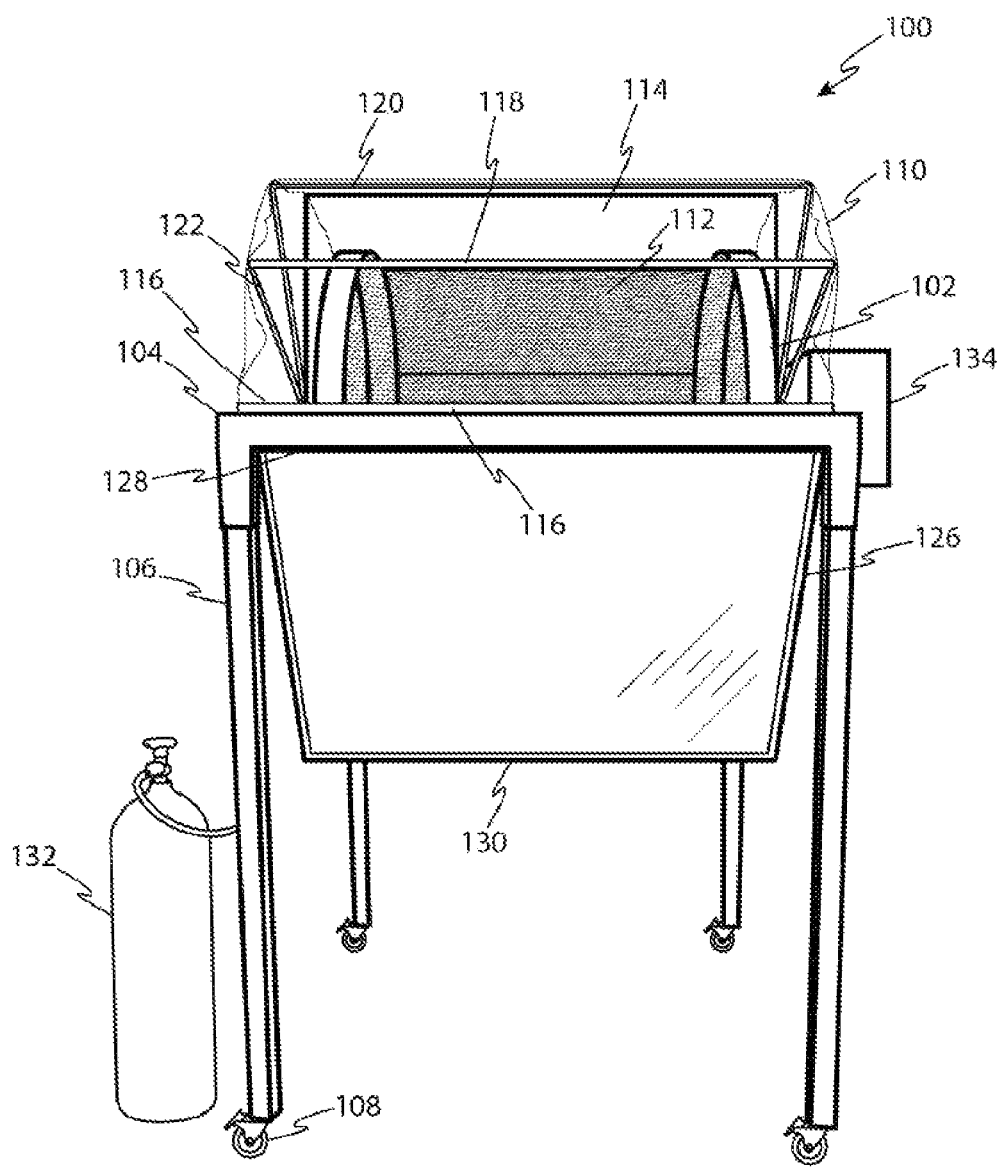
FIG. 1 is a front view of an assembled tumble trimmer system with a perforated axle adapted to infuse a freezing agent into a tumbler barrel, according to embodiments.

It is to be understood that the disclosure may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 2:
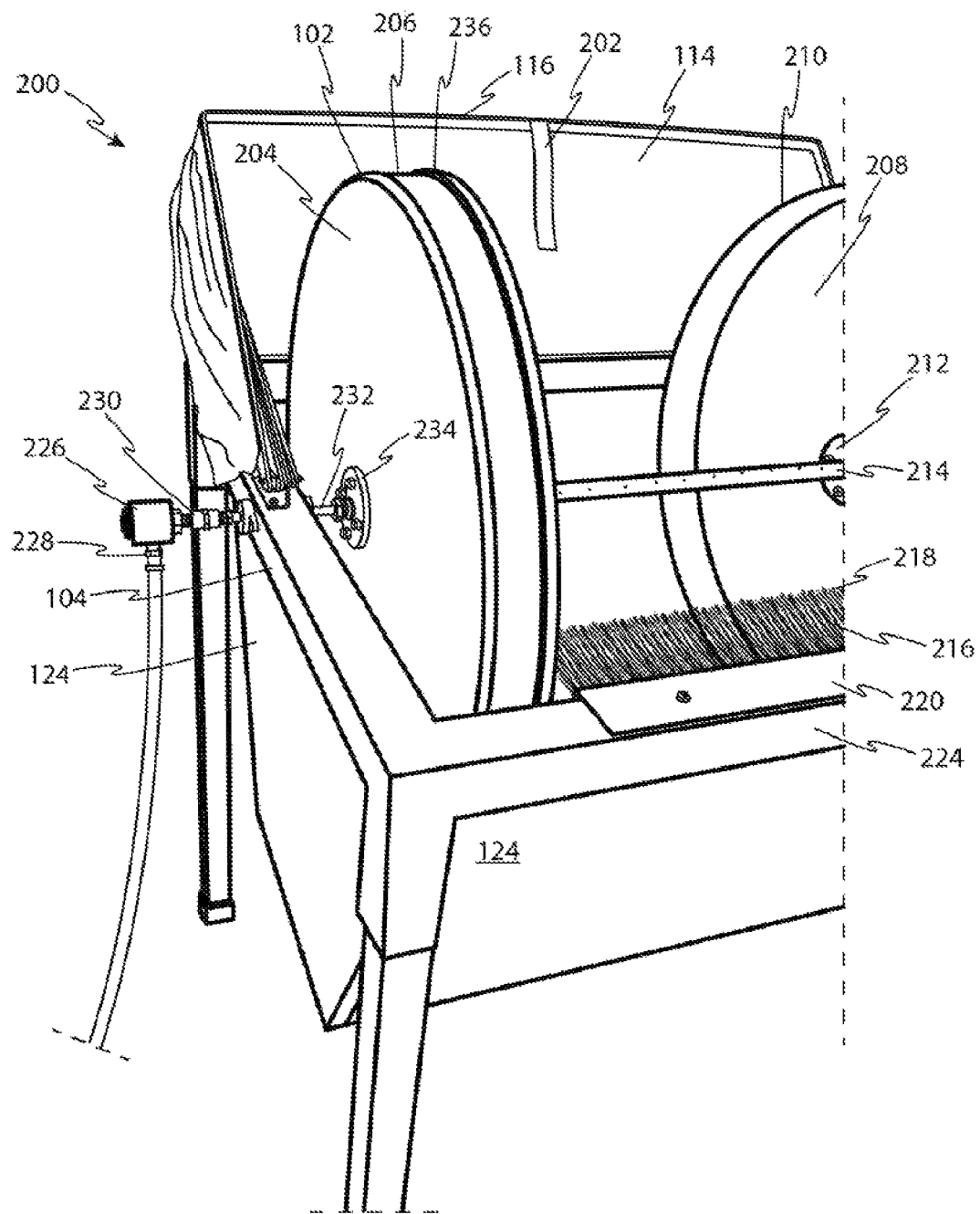
FIG. 2 is a close up perspective view of a portion of the system in FIG. 1 showing a freezing agent feed line going into a barrel (tumbler barrel) of the tumble trimmer, with a mesh net portion of the tumbler barrel removed and a top cover pulled back into an open position so as to expose a perforated axle of the tumbler barrel, according to embodiments.
Figure 3:
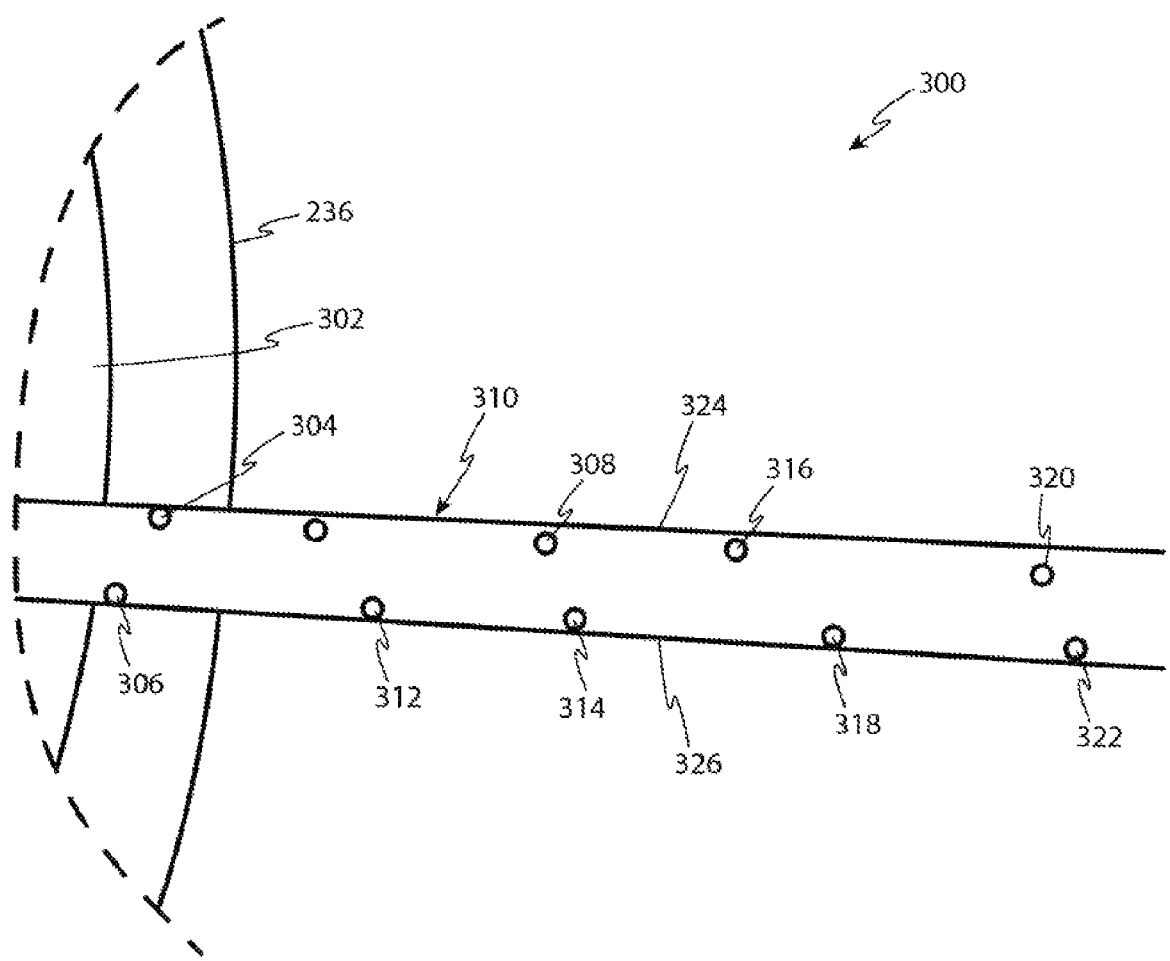
FIG. 3 is a detail close up view of a portion of the perforated axle in FIG. 2 showing multiple holes all around and along the axle, according to embodiments.
Figure 4:
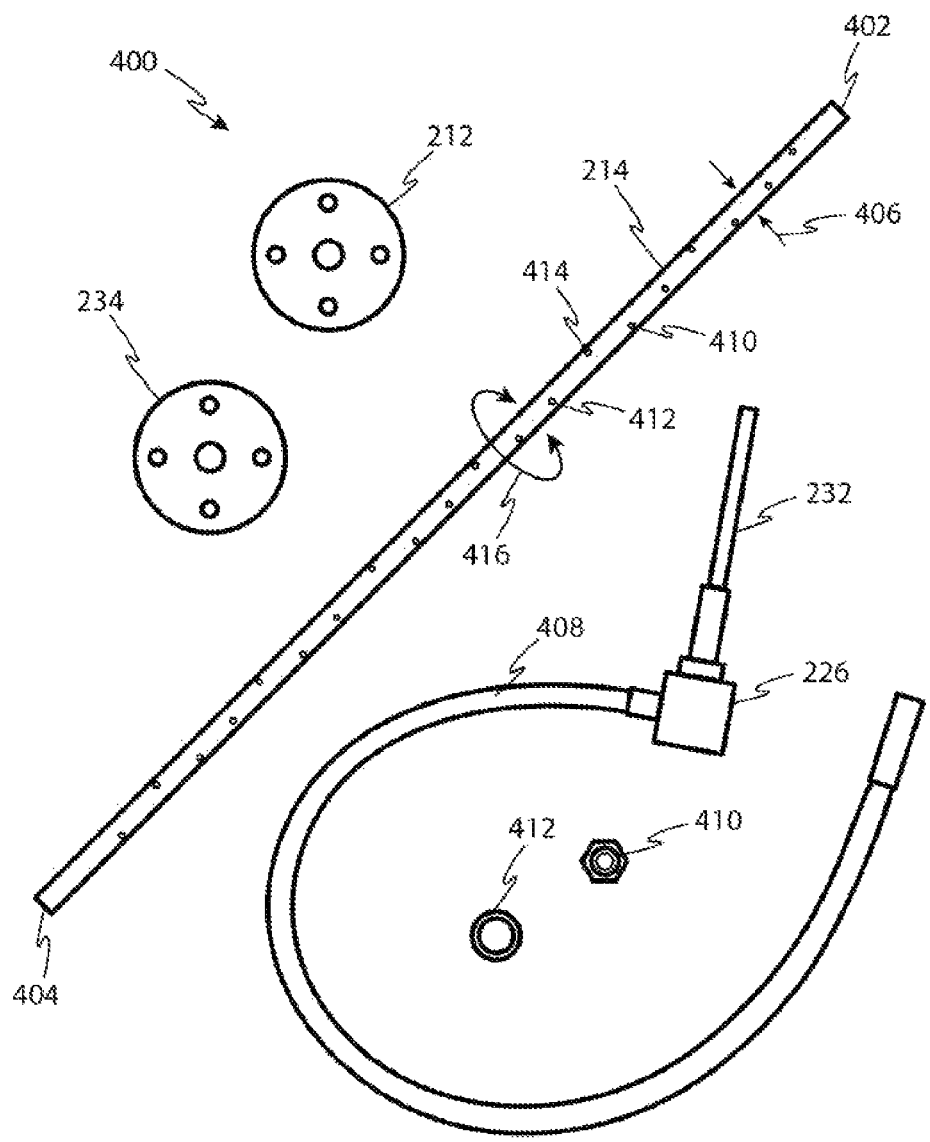
FIG. 4 is a view of a kit of components that converts a (dry) tumble trimmer system to a system adapted to flash freeze plant material to be tumble trimmed, or to provide a (wet) tumble trimmer system adapted to process (trim and/or separate) plant material having a higher moisture content than desirable for methods and equipment configured for processing dried plant material, according to embodiments.

The following description relates to methods and equipment comprising an open system cryo tumble trimmer or a tumble trimmer with a perforated axle adapted to infuse a freezing agent into a mesh tumbler barrel, the mesh tumbler barrel adapted for trimming plant material enclosed therein, and with an open funnel or chute positioned below the tumbler barrel adapted to catch and direct trim exiting the tumbler barrel into a bin or container positioned under the funnel. The methods and equipment may be used for various applications, including without limitation trimming material within the tumbler barrel and/or screening or isolating material via selection of tumbler barrel mesh/screen with appropriately sized openings so as to allow passage of material smaller than a predetermined size and retain material having larger than the predetermined size. For example, as further defined and described in the aforementioned U.S. patent applications by Bruggemann, the methods and equipment described herein, according to some embodiments, may be used for isolating specific portions of plant material, such as, for example, isolating kief from other components of cannabis plants. As an overview, FIG. 1 is a front view of an assembled mesh tumble trimmer adapted with a perforated tumbler barrel axle for infusing the tumbler barrel with a freezing agent, with the bottom area below the tumbler barrel open to a funnel and catch bin positionable below the funnel. FIGS. 2 and 3 are detail views, and FIG. 4 shows discrete components comprising a kit for converting a tumble trimmer configured for trimming dried plant material to a tumble trimmer configured for trimming dried plant material or (when a freezing agent is introduced via the perforated axle) wet (or not-dry-enough, or moisture containing) plant material.

Although the embodiments may be described in detail in the context of tumble trimming plant material described in the aforementioned U.S. patent applications incorporated herein by reference, the tumble trimmer system described herein may be used for trimming and/or separation of any of a wide variety of plant material or non-plant material, or material having either in a dried state or a less than dried state, or a state containing enough moisture that a freezing agent causes at least portions of the material to become brittle so as to be severable by the tumbling action within the tumbler barrel and/or grating against the mesh net/screen of the tumbler barrel and/or extending through the mesh openings (becoming sheared off or separated from larger material portions).

Turning now to the figures in greater detail, FIG. 1 is a front view of an assembled tumble trimmer system 100 with a perforated axle adapted to infuse a freezing agent, such as for example liquid carbon dioxide (CO2), into a tumbler barrel 102, according to embodiments. As shown, the barrel 102 may be supported within an axle frame 104 extending in an x-axis direction horizontally along the front and back of the assembly/system, parallel to the axle about which the barrel 102 rotates, and extending in a y-axis direction along the sides of the assembly/system, perpendicular to the axle. One or more legs 104 (preferably four) are shown extending downward in a z-axis direction toward a surface under the one or more casters (or rubber feet) 108, where the z-axis direction is perpendicular to the x-y plane created by the front, back, and side portions of the frame 104. A preferably retractable or removable openable top cover 110 is shown closed so as to cover the tumbler barrel 102 and mesh netting 112 covering the sides of the barrel between two end caps. Preferably transparent material 114 comprises the top cover 110, and the top cover may, according to some embodiments, comprise various structural components such as the front bar 116, intermediate bar 118, top bar 120, etc. as well as top cover support arms 122, the bars/support bars and support arms preferably permitting the top cover to be pulled downward to fully close over the top half of the barrel 102 (as shown in FIG. 1), or retractably or foldably opened rearward so as to expose the barrel 102 to permit, for example, replacing the mesh netting 112 (to refit the barrel 102 with mesh or screen with different sized openings), loading (untrimmed/not yet separated) plant material into the mesh enclosed barrel for processing, unloading (trimmed/separated material remaining in the barrel after processing (tumbling) in the barrel, or removal of the barrel for maintenance and/or cleaning.

The front bar 116 is shown in FIG. 1 in a fully closed position, with the front bar 116 closed to a front portion of the frame 104. A funnel or chute 124 is preferably positioned under the frame 104 supporting the axle of the barrel, such that the lower half of the barrel 102 is oriented (as shown in FIG. 1) within the funnel 124, with the funnel top 128 abutting the frame 104 and having sides 126 extending downward toward the floor (upon which the ends 108 of the legs 104 rest), and a funnel bottom 130 having a bottom opening or aperture (or funnel exit perimeter) that is smaller in cross-sectional area (measured in an x-y plane) than a cross-sectional area (also measured in an x-y plane) of a top opening or aperture (or funnel input/entrance perimeter) shown under the frame 104.

Also as shown in FIG. 1, a container 132 for holding a freezing agent (such as liquid CO2) is preferably included, and the container (or freezing agent source) 132 is fluidly connectable to the perforated axle of the tumbler barrel 102. A motor 134 is preferably included that is adapted to rotate the tumbler barrel 102 at one or more predetermined speeds (RPMs), or within a range of speed (in rotation per minute (RPM)).

The present inventor discovered and determined that a tumble trimmer system such as the system 100 shown in FIG. 1 comprising an open funnel bottom 130 permits faster/more efficient trimming and/or separating (i.e., processing of) plant material in various modes. The open funnel bottom 130 provides an open system whereby the barrel is positioned and operated in an enclosure that is open at least at the bottom of the funnel 124 where trimmings and/or separated plant material falling or making its way through the openings in the mesh net/screen 112 downward (gravitationally) through the funnel where a bin positioned under the opening 130 may be collected. In a dry trimming mode or configuration where dried plant material is loaded into the barrel 102 for tumble trimming, the plant material is loaded into the barrel through an opening in the mesh material, the top cover is closed downward over the top half of the barrel (so as to catch and contain any trimmed or separated plant material making its way through the mesh or screen that may be directed other than downward into the funnel, the tumbler barrel is rotated (using the motor) for a predetermined amount of time, during which time the trim or separated plant material that exits the barrel is collected (such as by a bin or other container) under the funnel bottom opening. Then, the plant material remaining within the barrel (having been trimmed of smaller stems, leaves, or other extensions via the tumbling action within the plant material being processed, grating and agitation of the plant material against the mesh netting or screen material of the barrel, and/or getting caught extending through openings in the mesh or screen and breaking off/becoming separated) may be collected by placing a fresh, replacement collection bin under the funnel bottom opening, opening the mesh/screen of the barrel and rotating the barrel so as to allow the remaining plant to exit the barrel downward through the funnel, whereby the trimmed/separated plant material that was too large to pass through the barrel during the tumble trimming operation (i.e. tumbling/rotating of the tumbler barrel) is collected in the fresh, replacement collection bin or container.

In a wet trimming mode or configuration where plant material having a moisture content higher than desirable for the above described dry trimming mode, the same or similar steps as described above may be used, with infusion of a freezing agent such as liquid CO2 or other liquid or compressed gas or substance adapted to flow into the barrel 102 via a perforated axle of the barrel just as tumbling (rotation of the barrel) begins or is underway, so that the freezing agent flash freezes the plant material in the barrel 102 of the (open) system 100, and causing smaller portions such as leaves and stems and/or other features to become brittle and thereby more easily broken off and separated during tumbling, whereby leafy portions and/or portions small enough to pass through the openings in the mesh net/screen of the tumbler barrel exit thru the mesh/screen, falling downward through the funnel 124 and the funnel opening 130 therebelow into a catch bin or container positioned underneath the funnel. As will be described in further detail with respect to FIGS. 2 and 3, the present inventor discovered and determined that the open system 100 (having an open funnel extending from the tumbler barrel mesh/screen sides down through the funnel) as shown in FIG. 1 allows for flash freezing and tumble trimming plant material such that the trim (plant material passing through the mesh barrel 102) falls direction out of the system 100 into, for example, a catch bin or container positionable below/directly underneath the funnel opening 130. In this way, the tumble trimmer system with perforated axle adapted to introduce/infuse/flash freeze the contents of the tumbler barrel 102 provides an open system for direct recovery of trimmed and/or separated plant material via collecting all components (i.e., trim/separated material passing through the mesh barrel as well as, via separately positioned bins under the output funnel, the plant material remaining within the mesh/screen tumbler barrel, without having to, as required by existing methods and equipment, physically remove the tumbler barrel from the frame holding the barrel (via its axle) or perform secondary operations to collect trim and separated plant material passing through (out of) the tumbler barrel during tumbling or extend a period of infusing/introducing the freezing agent so as to reach a predetermined temperature within a structure fully enclosing (containing) the barrel in a closed arrangement, due to those existing methods and equipment not having the configuration as shown in FIG. 1 comprising a system 100 with perforated tumbler barrel axle and/or comprising a system 100 with a funnel 124 with open bottom 130. In various embodiments, the present inventor discovered and determined that a tumbler barrel configured with a funnel and with a perforated axle (as described with respect to FIGS. 2 and 3) for infusion of a freezing agent into the tumbler barrel, permits tumble trimming with flash freezing of the plant material in an open system that permits direct collection of the resultant trimmed and separated plant material components (whereas the existing methods and equipment provide only closed systems requiring additional secondary steps for collection of the resultant trimmed and separated plant material components.

Next, FIG. 2 is a close up perspective view 200 of a portion of the system in FIG. 1 showing a freezing agent feed line going into a barrel (tumbler barrel) 102 of the tumble trimmer, with a mesh net portion of the tumbler barrel removed and a top cover pulled back into an open position so as to expose a perforated axle 214 of the tumbler barrel 102, according to embodiments. As shown, the retractable/openable top cover may comprise a cover open/close strap 202 affixed to a portion of the top cover permitting the top cover to be pulled over the top have of the mesh tumbler barrel 102 so as to bring the cover front bar 116 into contact with the front frame bar 224. Preferably the cover material 114 comprises a transparent material such as, for example, a transparent flexible plastic, so as to permit viewing of the tumbler barrel in (rotative) operation.

As shown, the tumbler barrel 102 preferably comprises two end caps 204 and 208 with the perforated axle 214 therebetween, the longitudinal (x-axis) length of the axle 214 being substantially the longitudinal distance (length along the x-axis) between the barrel end cap 204 shown on the left in FIG. 2 and the barrel end cap 208 shown on the right (end of the axle 214) in FIG. 2. Each of the end caps preferably comprise cylindrical ends or hoops extending radially outward from the axle 214 and having a circumferential surface 206 axially spaced apart from an inside edge 236, with the circumferential surface 206 adapted to secure mesh/mesh netting or screen material 112 (not shown in FIG. 2 but depicted in FIG. 1). The surface 206 may, for example, comprise one or the other of a hook and loop fastener whereby mesh netting may be removably secured (with the mesh netting/screen material having the cooperatively mating hook and loop fastening structure/fasteners). In this way, mesh net/screen material comprising the sides of the tumbler barrel 102 extending circumferentially between the end caps 204 and 208 so as to provide mesh net/screen material between the inside edge 236 of a first (left) barrel end cap 204 and the inside edge 210 of a second (right) barrel end cap 208.

Also as shown, hub ends 212 and 234 may be provided, which may comprise, for example, an outer portion 234 cooperatively engaging with an inner portion (not shown) opposite the barrel end cap 204 material extending radially outward to the mesh net attachment surface 206; and in similar fashion, the hub end inner portion 212 cooperatively engaging with an outer portion (not shown) opposite the barrel end cap 208 material extending radially outward to the mesh net attachment surface adjacent to the inside edge 210. The hub end inner and outer portions preferably attach to one another with the barren end cap radially extending material therebetween, and so as to secure the perforated axle 214 within a through hole in each of the barrel end caps.

Preferably, a source of a freezing agent (not shown) is fluidly coupled (via tube) to a rotary valve 226 and an axle feed 232 leading into the perforated axle 214 via fittings 228 and 230 on the input and output of the rotary valve 226, as shown in FIG. 2. In some embodiments, the rotary valve 226 comprises a valve adapted for supply and regulation of the flow of a freezing agent from a source (e.g., tank or container) 132 to the perforated axle 214, the perforated axle comprising a fluid conduit extending between hub ends (between barrel end caps) and numerous small holes (e.g., thirty to forty holes) space circumferentially all around and all along (preferably the entire length of) the perforated axle within the tumbler barrel 102. In some embodiments, the rotary valve 226 is adapted to receive a freezing agent from a source or container 132 of the freezing agent via a flexible hose or flexible tube from the source 132 (e.g., pressurized cylinder tank) and provide a right angle (90 degree) turn for supply of the freezing agent to the perforated axle via a fitting 230 and axle feed 232, as shown.

Also depicted in FIG. 2, a brush 216 having brush ends or bristles 218 sized and arranged to gently engage the outer surfaces of mesh netting or screen material (such as mesh net 112 shown in FIG. 1) as the tumbler barrel rotates. In some embodiments, the brush 216 is adapted so as to urge plant material caught within openings in the mesh netting or screen material to become free, and thereby able to fall downward from the tumbler barrel and into (and through) the funnel or chute 124. The funnel 124 may comprise, for example, stainless steel sheet material, so as to provide durability and easy to sanitize/clean interior surfaces where the resulting trim/trimmed/separated plant material components/products come into contact with the funnel/chute. In some embodiments the brush 216 is fastened to a top surface of the front frame bar 224 (as shown in FIG. 2) by a brush mount/brush mounting plate 220. The frame 104 (comprising front frame bar 224, a back frame bar, and side frame bars within the (horizontal) x-y plane of the axle 214) preferably comprises metal tubing. Other materials may be used, as is the case with other components comprising the system 100.

Next, FIG. 3 is a detail close up view 300 of a portion of the perforated axle 214 in FIG. 2 showing multiple holes all around and along the axle, according to embodiments. The portion of the perforated axle 214 shown comprises a portion of the axle near the inside radially extending wall 302 that is opposite the barrel end cap outer wall shown and pointed to as barrel end cap 204 in FIG. 2 and near the inside edge 236 of the barrel end cap 204. According to embodiments, the perforated axle 214 comprises a tube that extends between barrel end caps and that has a diameter 324-326 between a top circumferential edge 324 and a bottom circumferential edge 326. Preferably, each of the holes (or perforations) are adapted so as to permit the flow of a freezing agent within the tube (of the axle) to exit through each of a plurality of holes (preferably thirty to forty small holes/perforations) so as to evenly distribute the freezing agent into the interior of the mesh tumbler barrel. Preferably, the holes are positioned so as to evenly distribute the freezing agent into the interior of the mesh tumbler barrel 102 so as to evenly flash freeze plant material within the mesh net/screen tumbler barrel as the tumbler is rotating about the axle 214. Preferably the holes are distributed all around the circumference of the axle, and preferably the holes are positioned/distributed all along the (x-axis) longitudinal length of the axle. For example, holes 304 and 306 are positioned at different circumferential positions from one another whereas holes 304 and 312 are, as shown, positioned longitudinally separated from one another but more closely match a similar circumferential position with one another. Hole (perforation) 310 is intended to be on the other side of the axle surfaces visible in FIG. 3. Holes 308, 314, 316, 318, 320, and 322 are shown in positions that are longitudinally progressively farther away from the portion of the axle longitudinally closest to the barrel end inside edge 236 (or barrel inside radial wall 302). In some embodiments the holes are randomly positioned at various circumferential positions and spaced apart from one another across the length of the axle. In some embodiments, the holes/perforations are positioned so as to form a pattern that spirals around the circumference of the axle. In some embodiments, the holes/perforations are positioned evenly all around (the circumference of) the axle and all across the entire length of the axle. In some embodiments, the holes/perforations comprise thirty to forty similarly sized small holes, proportionate in size to the diameter 324-326 of the axle as shown in FIG. 3, and spread across at least a middle two-thirds of the axle length between the two barrel end caps.

FIG. 4 is a view of a freezing agent infusion kit of components 400 that converts a (dry) tumble trimmer system to a system adapted to flash freeze plant material to be tumble trimmed, or to provide a (wet) tumble trimmer system adapted to process (trim and/or separate) plant material having a higher moisture content than desirable for methods and equipment configured for processing dried plant material, according to embodiments. In one embodiment, the kit 400 comprises two hub ends 212 and 234, a perforated axle 214, and a freezing agent supply tube 408 with rotary valve 226 and axle feed 232, substantially as shown in FIG. 4. In one embodiment, the kit 400 further comprises axle interconnect and/or axle end closures 410 and 412. In some embodiments, the axle 214 comprises a tube extending longitudinally between axle ends 402 and 404, having an outside diameter 406 and a circumference 416 about the axle, and numerous holes or perforations 410, 412, 414 positioned all around (the circumference of) the axle and all along (the length 402-404 of) the axle, wherein each hole/perforation is adapted to permit the flow of a freezing agent from a conduit within the tube through the hole/perforation to areas outside the axle (in the interior space of a tumbler barrel 102).

In various embodiments, the freezing agent comprises liquid carbon dioxide (CO2) or a liquefied gas adapted to flash freeze plant material when infused into an interior space of a tumble trimmer barrel via a plurality of perforations in an axle of rotation of the tumble trimmer barrel, each perforation comprising a hole adapted to permit the flow of the freezing agent from the hole into the interior space. In various embodiments, the freezing agent comprises an inert freezing agent, and/or a liquid freezing agent, and/or liquid CO2, and/or liquid nitrogen, and/or a liquid noble gas.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Certain adaptations and modifications of the described embodiments can be made. Therefore, the above discussed embodiments are considered to be illustrative and not restrictive. The present disclosure is not to be limited in scope by the specific embodiments described herein. Further example embodiments may also include all of the steps, features, compositions and compounds referred to or indicated in this description, individually or collectively and any and all combinations or any two or more of the steps or features.

Throughout this document, the use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more. The words "comprising" (and any form of comprising, such as "comprise' and comprises), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", "forward", "backward", "back", "rear", "upwardly", "downwardly", etc. is used. It is to be understood that such terminology is used for ease of description and in a relative sense only and is not to be taken in any way as specifying an absolute direction or orientation.

The embodiments described herein may include one or more range of values (for example, size, displacement and field strength etc.). A range of values will be understood to include all values within the range, including the values defining the range, and values adjacent to the range that lead to the same or substantially the same outcome as the values immediately adjacent to that value which defines the boundary to the range. For example, a person skilled in the field will understand that a 10% variation in upper or lower limits of a range can be totally appropriate and is encompassed by the disclosure. More particularly, the variation in upper or lower limits of a range will be 5% or as is commonly recognized in the art, whichever is greater.

Throughout this specification relative language such as the words 'about' and 'approximately' are used. This language seeks to incorporate at least 10% variability to the specified number or range. That variability may be plus 10% or negative 10% of the particular number specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A tumbler barrel adapted to trim and/or separate plant material, the tumbler barrel comprising:
    an axle extending between a first and a second barrel end cap, the axle having a closed end at the second end cap;
    side material extending between the first and second end caps so as to capture the plant material to be trimmed and/or separated within an interior space bounded by the first and second end caps and side material, the side material comprising a mesh net or screen adapted to trim and/or separate portions of the plant material as the plant material is tumbled about the axle; and
    a plurality of perforations residing along the axle between the first and second end caps, each of the plurality of perforations comprising a hole adapted to permit a freezing agent to flow into the interior space within the barrel, and each hole spaced apart from one another along the axle between the first and second end caps and around a circumference of the axle so as to distribute the freezing agent throughout the interior space within the barrel when the freezing agent flows from each of the plurality of perforations, wherein a funnel or chute is positioned gravitationally below the tumbler barrel so as to catch and direct portions of the plant material falling through the mesh net or screen of the tumbler barrel, the funnel or chute having a bottom opening, the bottom opening being open to an area under the bottom opening, wherein all of the freezing agent introduced in the axle exits the axle via the plurality of perforations to the interior space, and at least some of the freezing agent at the interior space flows through the bottom opening.

2. The tumbler barrel of claim 1, wherein the plurality of perforations comprise thirty to forty holes positioned all around and along the axle.

3. The tumbler barrel of claim 1, wherein the freezing agent comprises liquid carbon dioxide or a liquefied gas adapted to flash freeze the plant material when infused into the interior space via the plurality of perforations.

4. The tumbler barrel of claim 1, wherein the axle is supported horizontally by a frame, the frame having one or more legs extending downward therefrom and providing the area under the bottom opening of the funnel or chute from which the plant material falling through the mesh net or screen passes, the area sized to permit a collection bin or container to be positioned under the bottom opening of the funnel or chute.

5. The tumbler barrel of claim 4, wherein the axle comprises a tube having the plurality of perforations positioned therein, and a source of the freezing agent is fluidly connected to the axle tube and the plurality of perforations.

6. The tumbler barrel of claim 5, wherein the source of the freezing agent is fluidly connected to the axle tube via a rotary valve, the rotary valve adapted to regulate fluid flow of the freezing agent into the axle tube.

7. The tumbler barrel of claim 4, wherein an openable top cover extends over the tumbler barrel so as to cover a top half of the tumbler barrel that extends upward from the frame and axle positioned thereon, and a lower half of the tumbler barrel is positioned within the funnel or chute so that the plant material that passes through the mesh net or screen is directed downward through the funnel or chute by the top cover closed over the tumbler barrel and sides of the funnel or chute.

8. The tumbler barrel of claim 7, wherein an open system is established comprising the top cover, tumbler barrel with perforated axle, frame, one or more legs, funnel or chute extending under the tumbler barrel, and a source of the freezing agent fluidly connected to the axle and the plurality of perforations therewithin.

9. A tumble trimmer system comprising a tumble trimmer with a perforated axle adapted to infuse a freezing agent into a mesh tumbler barrel, the perforated axle having a closed end, the mesh tumbler barrel adapted for trimming and/or separating plant material enclosed therein, and with an open funnel or chute positioned below the tumbler barrel adapted to catch and direct trimmed and/or separated plant material exiting the tumbler barrel into a bin or container positioned under the funnel or chute, wherein the perforated axle comprises a plurality of perforations positioned around a circumference of and along a length of the axle, the open funnel or chute having a bottom opening, the bottom opening being open to an area under the bottom opening, wherein all of the freezing agent introduced in the axle exits the axle via the plurality of perforations to an interior space of the mesh tumbler barrel, and at least some of the freezing agent at the interior space flows through the bottom opening.

10. The system of claim 9, wherein the perforated axle comprises thirty to forty holes positioned all around and along the axle.

11. The system of claim 9, wherein the freezing agent comprises liquid carbon dioxide or a liquefied gas adapted to flash freeze the plant material when infused into an interior space of the tumbler barrel via the plurality of perforations.

12. The system of claim 9, wherein the axle is supported horizontally by a frame, the frame having one or more legs extending downward therefrom and providing the area under the bottom opening of the funnel or chute from which the trimmed and/or separated plant material passes, the area sized to permit a collection bin or container to be positioned under the bottom opening of the funnel or chute.

13. The system of claim 12, wherein an openable top cover extends over the tumbler barrel so as to cover a top half of the tumbler barrel that extends upward from the frame and axle positioned thereon, and a lower half of the tumbler barrel is positioned within the funnel or chute so that the plant material that passes through a mesh net or screen of the mesh tumbler barrel is directed downward through the funnel or chute by the top cover closed over the tumbler barrel and sides of the funnel or chute.

14. The system of claim 13, wherein an open system is established comprising the top cover, tumbler barrel with perforated axle, frame, one or more legs, funnel or chute extending under the tumbler barrel, and a source of the freezing agent fluidly connected to the axle and the plurality of perforations therewithin.

15. A method of using the tumble trimmer system of claim 9, the method comprising:

providing plant material to be trimmed and/or separated;

placing the plant material into the mesh tumbler barrel via an opening in the mesh tumbler barrel;

tumbling the plant material by rotating the tumbler barrel about its axle and introducing the freezing agent into an interior space of the tumbler barrel via the plurality of perforations positioned around the circumference of and along the entire length of the perforated axle; and collecting trimmed and/or separated plant material exiting mesh net or screen portions of the tumbler barrel in the bin or container positioned under the funnel or chute.

16. The method of claim 15, wherein the freezing agent comprises liquid carbon dioxide or a liquefied gas adapted to flash freeze the plant material when infused into the interior space of the tumbler barrel via the plurality of perforations.

17. The method of claim 15, further comprising:

replacing the bin or container positioned under the funnel or chute with a replacement bin or container;

opening the opening in the mesh tumbler barrel;

rotating the mesh tumbler barrel about its axle so as to orient the opening downward toward the funnel or chute; and without removing the mesh tumbler barrel from a frame supporting the axle in a horizontal orientation, collecting in the replacement bin or container plant material that did not pass through the mesh net or screen portions of the tumbler barrel during the step of tumbling the plant material by rotating the tumbler barrel.

18. The method of claim 17, further comprising:

returning the tumble trimmer system to a ready condition for processing a subsequent batch of plant material by removing the replacement bin or container;

positioning a subsequent batch bin or container under the funnel or chute; and rotating the mesh tumbler barrel about its axle so as to orient the opening upward away from the funnel or chute.

19. The method of claim 15, wherein the perforated axle comprises thirty to forty holes positioned all around and along the axle.

* * * * *